(12) United States Patent
Wibowo et al.

(10) Patent No.: US 11,827,784 B2
(45) Date of Patent: Nov. 28, 2023

(54) FUNCTIONALIZED POLYACRYLATE POLYMER COMPOSITIONS

(71) Applicant: Huntsman International LLC, The Woodlands, TX (US)

(72) Inventors: Antonius Wibowo, Boortmeerbeek (BE); Ben Wambacq, Leuven (BE); Xiaohua Fang, The Woodlands, TX (US); Haibo Zhao, The Woodlands, TX (US)

(73) Assignee: Huntsman International LLC, The Woodlands, TX (US)

( * ) Notice: Subject to any disclaimer, the term of this patent is extended or adjusted under 35 U.S.C. 154(b) by 116 days.

(21) Appl. No.: 16/335,488

(22) PCT Filed: Oct. 27, 2017

(86) PCT No.: PCT/EP2017/077593
§ 371 (c)(1),
(2) Date: Mar. 21, 2019

(87) PCT Pub. No.: WO2018/099659
PCT Pub. Date: Jun. 7, 2018

(65) Prior Publication Data
US 2021/0292552 A1    Sep. 23, 2021

(30) Foreign Application Priority Data
Dec. 1, 2016    (EP) .................................. 16201722

(51) Int. Cl.
*C08L 71/02*    (2006.01)
*C04B 24/26*    (2006.01)
*C04B 28/04*    (2006.01)

(52) U.S. Cl.
CPC .......... *C08L 71/02* (2013.01); *C04B 24/2647* (2013.01); *C04B 24/2658* (2013.01); *C04B 28/04* (2013.01); *C04B 2201/52* (2013.01)

(58) Field of Classification Search
CPC . C08L 71/02; C04B 24/2647; C04B 24/2658; C04B 28/04; C04B 2201/52
See application file for complete search history.

(56) References Cited

U.S. PATENT DOCUMENTS

| | | | |
|---|---|---|---|
| 2002/0193547 A1* | 12/2002 | Yuasa | C08L 51/04 526/318.5 |
| 2007/0142505 A1* | 6/2007 | Ueta | C04B 40/0039 524/2 |
| 2008/0119602 A1 | 5/2008 | Sulser et al. | |
| 2011/0160351 A1* | 6/2011 | Hampel | C04B 28/147 524/5 |
| 2014/0288227 A1* | 9/2014 | Thetford | C09D 17/002 524/502 |
| 2015/0133584 A1* | 5/2015 | Kuo | C04B 24/267 525/154 |

FOREIGN PATENT DOCUMENTS

| | | | | |
|---|---|---|---|---|
| EP | 1061089 A1 * | 12/2000 | ......... | C04B 24/2647 |
| EP | 1136508 A | 9/2001 | | |
| EP | 1184353 A | 3/2002 | | |
| EP | 1604961 A | 12/2005 | | |
| EP | 2154118 A | 2/2010 | | |
| FR | 3029524 A | 6/2016 | | |
| WO | 9735814 A | 10/1997 | | |
| WO | 2012112326 A | 8/2012 | | |
| WO | 20130164471 A | 11/2013 | | |

* cited by examiner

*Primary Examiner* — John E Uselding
(74) *Attorney, Agent, or Firm* — HUNTSMAN INTERNATIONAL LLC; Aleece Hayes

(57) ABSTRACT

Functionalized polyacrylate polymer compositions for treating clay or clay bearing aggregates compositions are disclosed. Also disclosed are methods for preparing the functionalized polyacrylate polymer compositions, admixtures containing such polymers and methods for the mitigation of clays in cementitious and aggregate compositions using these polymers.

14 Claims, No Drawings

FUNCTIONALIZED POLYACRYLATE POLYMER COMPOSITIONS

CROSS-REFERENCE TO RELATED APPLICATIONS

This application is the National Phase of International Application PCT/EP2017/077593 filed Oct. 27, 2017 which designated the U.S., and which claims priority to European App. Serial No. 16201722.2 filed Dec. 1, 2016. The noted applications are incorporated herein by reference.

STATEMENT REGARDING FEDERALLY SPONSORED RESEARCH OR DEVELOPMENT

Not Applicable.

FIELD OF INVENTION

The present disclosure relates to functionalized polyacrylate polymer compositions, methods for making functionalized polyacrylate polymer compositions, admixture compositions and methods to mitigate the effects of clays in cementitious or aggregate compositions.

BACKGROUND

Concrete, mortar, asphalt, road base, well-drilling fluids and muds and other construction materials often contain clays that are carried in the sand, rock, gravel or other aggregates that are used for making these construction materials. Clays can adversely effect the properties and/or performance of construction materials because they absorb water and/or chemical agents such as water reducing agents that are used in these materials.

Good working water reducing agents are polycarboxylate ether-based (PCE) dispersants. PCE dispersants are typically composed of a carbon backbone to which both carboxylate groups and pendant groups such as ethoxylene oxide (EO) groups, propylene oxide (PO) groups and/or a combination of EO/PO groups are attached. These PCE dispersants are superplasticizers and their addition to concrete or mortar allows the reduction of the water to cement ratio, improves the workability of the concrete mixture, and enables the production of self-consolidating concrete and high performance concrete.

It is known that the dosage efficiencies of the PCE dispersants tend to vary among different cement or concrete mixtures. It has been found that the problem of varying PCE dispersant dosage efficiencies is attributed to the presence of clays in the aggregate used to make concrete or mortar. It has been found that negative interactions occur between the PCE dispersants and the clays in the mortar or concrete. These negative interactions result in a poor dosage response in the concrete or cement mixtures and poor workability of the fresh mortar or concrete.

Several approaches have been found to be effective in restoring the dosage response of these superplasticizers. For example, US Pub. No. 2002/0121229 A1 describes the use of clay activity modifying agents comprising an inorganic cation, an organic cation, a polar organic molecule or a clay dispersant operative to reduce absorptivity of the clay. Also US Pub. No. 2015/0133584 A1 describes an agent that can mitigate the clay present in clay bearing aggregates used for construction purposes, wherein the agent is a copolymer having a methacrylic acid and acrylic acid backbone on which is grafted ethylene oxide and/or propylene oxide.

Although these clay mitigation agents seem to have a positive effect on clay bearing concrete or mortar, there still remains a need for clay mitigation agents that are able to provide a good workability and prevents the drawbacks as described above.

SUMMARY OF INVENTION

It is an object of current disclosure to find compositions that are able to improve workability for cement, mortar or other construction materials when clay is present.

In an embodiment of the present disclosure, a functionalized polyacrylate polymer composition for treating clay or clay bearing aggregates is disclosed that has a first component represented by the following structure:

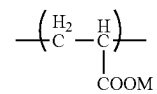

wherein M is H, an alkali metal or an organic radical; and a second component represented by the following structure:

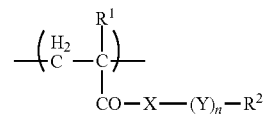

wherein $R^1$ is H or $CH_3$; $R^2$ is H or a $C_1$-$C_4$ alkyl; X is O or NH; and Y is represented by the following structure:

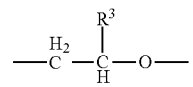

wherein $R^3$ is independently H or $CH_3$ in each Y structure of $(Y)_n$; and n is 35 to 200; and
wherein $R^3$ is H in at least 70% of the individual Y structures of $(Y)_n$.

In embodiments of the present disclosure, the acid value of the functionalized polyacrylate polymer composition is in the range of from about 25 to about 50 mg KOH/g, and wherein the average molecular weight of the functionalized polyacrylate polymer composition is in the range of from about 20,000 g/mol to about 100,000 g/mol.

According to some embodiments of the present disclosure, a functionalized polyacrylate polymer composition is disclosed that has a third component selected from an acrylamide, N-alkyl acrylamide, N,N-dialkyl acrylamide, 3-acrylamido-2-methylpropane sulfonic acid, a salt of 3-acrylamido-2-methylpropane sulfonic acid, styrene sulfonic acid, a salt of styrene sulfonic acid and combinations thereof.

According to some embodiments of the present disclosure, the functionalized polyacrylate polymer composition has an acid value in the range of from about 30 to about 45 mg KOH/g.

According to some embodiments of the present disclosure, the molar ratio of the first component to the second component of the functionalized polyacrylate polymer composition is in the range of from about 1:2 to about 2:1.

According to some embodiments of the present disclosure, the molar ratio of the first component to the second component of the functionalized polyacrylate polymer composition is in the range of from about 5:9 to about 5:4.

According to some embodiments of the present disclosure, $R^3$ is H in at least 85% of the individual Y structures of $(Y)_n$ in the second component of the functionalized polyacrylate polymer composition.

According to some embodiments of the present disclosure, the first component has an average molecular weight in the range of from about 4,000 g/mol to about 20,000 g/mol.

According to some embodiments of the present disclosure, the second component has an average molecular weight in the range of from about 1,800 g/mol to about 6,000 g/mol.

According to some embodiments of the present disclosure, the organic radical in the first component is selected from a substituted primary amine, a substituted secondary amine, a substituted tertiary amine, a substituted quaternary amine, a halide-free quaternary amine and combinations thereof.

According to some embodiments of the present disclosure, the organic radical in the first component is selected from a $C_{1-20}$ alkylamine, a $C_{1-20}$ alkalonamine, a $C_{5-8}$ cycloalkylamine, a $C_{8-14}$ arylamine, an ethyleneamine, an ethyleneamine alkoxylate, a polyethyleneamine and combinations thereof.

According to some embodiments of the present disclosure, the organic radical in the first component is selected from a methylamine, a dimethylamine, a trimethylamine, a monoethanolamine, a diethanolamine, a triethanolamine, a methyl diethanolamine, a triisopropanolamine, a diisopropanolamine, a methyl isopropanolamine, a methyldiisopropanolamine, an ethyl isopropanolamine, an ethyl diisopropanolamine, a cyclohexylamine, a dicyclohexylamine, a phenylamine, a diphenylamine and combinations thereof.

According to some embodiments of the present disclosure, the organic radical in the first component is selected from a tetramethylammonium, a tetraethylammonium, a tetrapropylammonium, a tetra-n-butylammonium, an ethyltrimethylammonium, a propyltrimethylammonium, a cetyltrimethylammonium, a tetradecyltrimethylammonium, 1,6-hexamethylene bis(trimethylammonium), decamethylene-bis-(trimethylammonium), (2-hydroxyethyl)trimethylammonium, (2-hydroxyethyl)triethylammonium, (2-hydroxyethyl)tripropylammonium, (2-hydroxyethyl)tri-n-butylammonium, (2-hydroxyethyl)methyl diethylammonium, (2-hydroxypropyl)trimethylammonium, (2-hydroxypropyl)triethylammonium, (3-hydroxypropyl)trimethylammonium, (3-hydroxypropyl)triethylammonium, (4-hydroxybutyl)trimethylammonium, (4-hydroxybutyl)triethylammonium, diallyl dimethylammonium, bis(2-hydroxyethyl)dimethylammonium, bis(2-hydroxyethyl)diethylammonium, bis(2-hydroxypropyl)dimethylammonium, bis(2-hydroxypropyl)diethylammonium, tris(2-hydroxyethyl)methylammonium, tris(2-hydroxyethyl)ethylammonium, tris(2-hydroxypropyl)methylammonium, tris(2-hydroxpropyl)ethylammonium, tris(2-hydroxyethyl) octadecylammonium, tetrakis(hydroxymethyl)ammonium, tetrakis(methoxymethyl)ammonium, tetrakis(2-hydroxyethyl)ammonium, tetrakis(2-hydroxypropyl)ammonium, N,N,N-trimethylethanolammonium and combinations thereof.

In an embodiment of the present disclosure, an admixture composition is disclosed that comprises a functionalized polyacrylate polymer composition at least one admixture additive selected from a binder, water, a dispersant, a water reducing agent, a plasticizer, a superplasticizer, a set retarder, a set accelerator, a defoamer, an air entraining agent, a shrinkage-reducing agent, a crack control agent, a strength enhancing agent, a fiber and combinations thereof.

In an embodiment of the present disclosure, a method for preparing a functionalized polyacrylate polymer composition is disclosed that includes polymerizing a first component represented by the following structure:

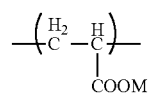

wherein M is H, an alkali metal or an organic radical; with a second component represented by the following structure:

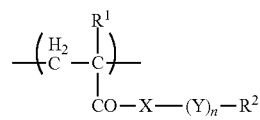

wherein $R^1$ is H or $CH_3$; $R^2$ is independently H or a $C_1$-$C_4$ alkyl; X is O or NH; and Y is represented by the following structure:

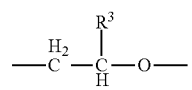

wherein $R^3$ is independently H or $CH_3$ in each Y structure of $(Y)_n$; and n is 35 to 200; and wherein $R^3$ is H in at least 70% of the individual Y structures of $(Y)_n$.

According to some embodiments of the present disclosure, the method prepares a functionalized polyacrylate polymer composition with an acid value in the range of from about 25 to about 50 mg KOH/g.

According to some embodiments of the present disclosure, the method prepares a functionalized polyacrylate polymer composition with an average molecular weight in the range of from about 20,000 g/mol to about 100,000 g/mol.

According to some embodiments of the present disclosure, the method for preparing a functionalized polyacrylate polymer composition further includes polymerizing the first component and the second component with a third component. The third component may be selected from an acrylamide, a N-alkyl acrylamide, a N,N-dialkyl acrylamide, 3-acrylamido-2-methylpropane sulfonic acid, a salt of 3-acrylamido-2-methylpropane sulfonic acid, styrene sulfonic acid, a salt of styrene sulfonic acid and combinations thereof.

According to some embodiments of the present disclosure, the method for preparing a functionalized polyacrylate polymer composition further includes neutralizing the functionalized polyacrylate polymer composition.

In an embodiment of the present disclosure, a method for the mitigation of clays in a cementitious composition or an aggregate composition is disclosed that includes adding a functionalized polyacrylate polymer composition to a cementitious composition or an aggregate composition.

According to some embodiments of the present disclosure, the method teaches adding the functionalized polyacrylate polymer composition to the cementitious composition or aggregate composition in an amount of about 0.001 wt % to about 30.000 wt % based on dry weight of clay contained in the cementitious composition or aggregate composition.

DETAILED DESCRIPTION

The term "aggregate" is intended to include both fine aggregates and coarse aggregates, as is common in the art. The term of fine aggregates refers to a material wherein at least 95 wt % of the particles have an average diameter of less than 9.5 mm. Fine aggregates include natural sand, manufactured sand and/or a combination thereof. The term coarse aggregates refers to gravel or crushed stone that has a particle size greater than 0.5 cm in diameter. The coarse aggregate may be natural, artificial or recycled aggregate from material previously used in construction and/or a combination thereof, but may in some cases comprise at least partially of graded metallic material such as iron chips, or manufactured aggregate, such as slag. The precise size, purity, quality and quantity or ranges thereof, of the fine and coarse aggregates will vary upon the desired use and properties of mortar or concrete. Clay bearing aggregates are aggregates which carry clay, or which are mixed with clay. The term "aggregate composition" refers to compositions containing aggregate.

The term "cementitious composition" refers to pastes, mortars, grout and concrete compositions comprising a hydraulic cement binder. The terms "paste", "mortar" and "concrete" are terms of art: pastes are mixtures composed of a hydraulic cement binder (usually, but not exclusively, Portland cement, Masonry cement, or Mortar cement and may also include limestone, hydrated lime, fly ash, blast furnace slag, and silica fume or other materials commonly included in such cements) and water; mortars and grouts are pastes additionally including fine aggregate, and concretes are mortars additionally including coarse aggregate.

The present disclosure relates to treatment of all types of clays. The term "clays" is intended to refer to aluminium and/or magnesium silicates, in particular phyllosilicates having a lamellar structure, which are typically spaced with approximately from 7 to approximately 14 angstroms. The term "clay" as used herein is also intended to refer to clays not having such structures, such as amorphous clays. The clays may include but are not limited to swelling clays of the 2:1 type (such as smectite groups type clays which includes diocathedral smectites such as montmorillonite, nontronite and beidellite and trioctahedral smectites for example saponite) or also of type 1:1 (such as kaolinite) or of the 2:1:1 type (such as chlorite). Clays which are commonly found in sands include montmorillonite, illite, kaolinate, muscovite and chlorite.

The term of "workability" refers to the ability of cementitious mixtures to be poured into a form. A good workability means that the pouring into the form occurs without any difficulty. Workability includes consistency, flowability, moldability, fluidity cohesiveness, slump and compactability. The workability can be measured either by means of a slump test, vebe test, flow table test or other specific methods for cementitious mixtures that are used for special applications, such as self-compacting concrete. In the examples of present disclosure the workability is measured in mm and is defined as [workability]=[slump]+[flow]−100. The workability takes into account the slump test (ASTM procedure using slump cone standard, ASTM C143) and the flow table test (ASTM C230/C230M).

In embodiments of the present disclosure, functionalized polyacrylate polymer compositions are disclosed that have a first component and a second component. The first component has the following structure:

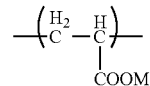

The first component is thus a polymerizable acrylic acid. M in the first component may be hydrogen (H), an alkali metal or an organic radical.

In an embodiment, M in the first component is an alkali metal. The alkali metal may be monovalent, divalent or trivalent. Monovalent alkali metals include sodium, potassium and lithium. Divalent alkali metals can be magnesium, calcium and barium. Aluminum is an example of a trivalent alkali metal.

In an embodiment, M is an organic radical. The organic amine radical may be selected from substituted primary amines, substituted secondary amines, substituted tertiary amines, substituted quaternary amines, halide-free quaternary amines and combinations thereof.

Examples of the organic radical include, without limitation, a $C_{1-20}$ alkylamine, a $C_{1-20}$ alkalonamine, a $C_{5-8}$ cycloalkylamine, a $C_{8-14}$ arylamine, an ethyleneamine, an ethyleneamine alkoxylate, a polyethyleneamine and combinations thereof.

The organic amine radical also may be selected from methylamines, dimethylamines, trimethylamines, monoethanolamines, diethanolamines, triethanolamines, methyl diethanolamines, triisopropanolamines, diisopropanolamines, methyl isopropanolamine, methyldiisopropanolamine, ethyl isopropanolamines, ethyl diisopropanolamines, cyclohexylamines, dicyclohexylamines, phenylamines, dipheniylamines and combinations thereof.

The organic radical can also be selected from quaternary radicals, preferably halide free quaternary amines, or other types of quarternary structures which can be prepared in accordance with U.S. Pat. No. 6,340,559. Examples of quarternary amines are tris-(2-hydroxyethyl) methylammonium hydroxide and choline hydroxide. It is possible that there are tertiary amines present in the quaternary amine.

Examples of the organic radical may be selected from, without limitation, tetramethylammonium, tetraethylammonium, tetrapropylammonium, tetra-n-butylammonium, ethyltrimethylammonium, propyltrimethylammonium, cetyltrimethylammonium, tetradecyltrimethylammonium, 1,6-hexamethylene bis(trimethylammonium), decamethylene-bis-(trimethylammonium), (2-hydroxyethyl)trimethylammonium, (2-hydroxyethyl)triethylammonium, (2-hydroxyethyl)tripropylammonium, (2-hydroxyethyl)tri-n-butylammonium, (2-hydroxyethyl)methyldi ethylammonium, (2-hydroxypropyl)trimethylammonium, (2-hydroxypropyl)triethylammonium, (3-hydroxypropyl) trimethylammonium, (3-hydroxypropyl)triethylammonium, (4-hydroxybutyl)trimethylammonium, (4-hydroxybutyl)triethylammonium, diallyl dimethylammonium, bis(2-hydroxyethyl)dimethylammonium, bis(2-hydroxyethyl)diethylammonium, bis(2-hydroxypropyl)dimethylammonium, bis(2-hydroxypropyl)diethylammonium, tris(2-hydroxyethyl)methylammonium, tris(2-hydroxyethyl)ethylammonium, tris(2-hydroxypropyl)methylammonium, tris(2-hydroxpropyl)ethylammonium, tris(2-hydroxyethyl)octadecylammonium, tetrakis(hydroxymethyl)ammonium, tetrakis(methoxymethyl)ammonium, tetrakis(2-hydroxyethyl)ammonium and tetrakis(2-hydroxypropyl)ammonium, N,N,N-trimethylethanolammonium and combinations thereof.

In embodiments of the present disclosure, the first component has an average molecular weight in the range of from about 4,000 grams/mole (g/mol) to about 20,000 g/mol. A commercial example of the first component includes SOKA-LAN® CP10s, an un-neutralized polyacrylic acid with a molecular weight of 4,000 g/mol available from BASF. Another commercial example of the first component includes CARBOSPERSE® K-XP44, an un-neutralized polyacrylic acid with a molecular weight of 6,000 g/mol available from Lubrizol.

The second component of the functionalized polyacrylate polymer composition has the following structure:

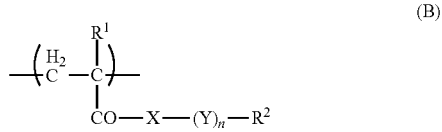

(B)

In the second component $R^1$ is hydrogen (H) or a methyl group ($CH_3$). When $R^1$ is hydrogen, that segment is formed from an ethylene oxide group. When $R^1$ is a methyl group ($CH_3$), that segment is formed from a propylene oxide group.

In the second component, $R^2$ is H or a $C_1$-$C_4$ alkyl. X is oxygen (O) or a nitrogen group (NH). Y is represented by the following structure:

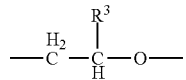

$R^3$ is independently H or $CH_3$ in each Y structure of $(Y)_n$. If $R^3$ is H in the individual structure Y, then that structure Y is derived from ethylene oxide. If $R^3$ is $CH_3$, then that individual structure Y is derived from propylene oxide. $(Y)_n$ may have a combination of ethylene oxide and propylene oxide used to prepare it. These different Y units may be either mixed together randomly or may form blocks of uniform Y units. By "mixed," it is meant that the ethylene oxide-based units and propylene oxide-based units of Y are interspersed in a random manner so that you have ethylene oxide-based units and propylene oxide-based units next to one another. By "block," it is meant that the ethylene oxide-based units of Y are together in one segment of $(Y)_n$ and then the propylene oxide-based units of Y are together in another segment of $(Y)_n$.

The variable n is independently 35 to 200. It is considered that the number of alkylene oxide units (Y) in the component B also improves the molecules' efficiency in mitigating clay.

It is also considered that if the second component of the polymer is less hydrophobic, the functionalized polyacrylate polymer composition has a better effect on the clay mitigation and the workability of the clay. Ethylene oxide-based Y units are typically less hydrophobic.

In embodiments of the present disclosure, $R^3$ is H in at least 70% of the individual Y structures of $(Y)_n$. By way of example, if $(Y)_n$ is $(Y)_{100}$, then at least 70 of the 100 individual Y structures have $R^3$ being H (ethylene oxide-based Y). Then the remaining 30 or less of the 100 individual Y structures will have $R^3$ being $CH_3$ (propylene oxide-based Y).

In embodiments of the present disclosure, $R^3$ is H in at least 75% or 80% of the individual Y structures of $(Y)_n$. In embodiments of the present disclosure, $R^3$ is H in at least 85% of the individual Y structures of $(Y)_n$. In embodiments of the present disclosure, $R^3$ is H in at least 90 or 95% of the individual Y structures of $(Y)_n$.

In embodiments of the present disclosure, the individual structures Y that have $R^3$ being H comprise at least 70% of the weight of $(Y)_n$. In embodiments of the present disclosure, the individual structures Y that have $R^3$ being H comprise at least 75% of the weight of $(Y)_n$. In embodiments of the present disclosure, the individual structures Y that have $R^3$ being H comprise at least 80% of the weight of $(Y)_n$. In embodiments of the present disclosure, the individual structures Y that have $R^3$ being H comprise at least 85% of the weight of $(Y)_n$. In embodiments of the present disclosure, the individual structures Y that have $R^3$ being H comprise at least 90% of the weight of $(Y)_n$. In embodiments of the present disclosure, the individual structures Y that have $R^3$ being H comprise at least 95% of the weight of $(Y)_n$. In embodiments of the present disclosure, the individual structures Y that have $R^3$ being H comprise about 100% of the weight of $(Y)_n$.

The second component is thus a polymerisable polyoxyalkylene macromonomer. Examples of this second component may be polyoxyalkylene (meth)acrylate ester, N-polyoxyalkylene acrylamide and combinations thereof.

In embodiments of the present disclosure, the average molecular weight of the second component is about 1,800 g/mol or greater than 1,800 g/mol. In embodiments of the present disclosure, the average molecular weight of the second component is in the range of from about 1,800 g/mol to about 6,000 g/mol.

Commercial examples of the second component include SURFONAMINE® L200 polyetheramine available from Huntsman Corporation. SURFONAMINE® L200 polyetheramine is a polyethermonoamine with an average molecular weight of 2,000 g/mol and it has an ethylene oxide to propylene oxide weight ratio of 95 wt % to 5 wt %. So SURFONAMINE® L200 polyetheramine has individual structures Y with $R^3$ being H comprising 95% of the weight of $(Y)_n$.

Another suitable commercially available second component is methoxy polyethylene glycol available from Clariant. Polyglykol M 2000 is a linear, mono hydroxy-functional polyethylene glycol monomethyl ether (M-PEG) that is water soluble. The methoxy polyethylene glycol has an average molecular weight of 2,000 g/mol and it has an ethylene oxide to propylene oxide weight ratio of 100 wt % to 0 wt %. Polyglykol M 2000 has $(Y)_n$ with a 100 wt % of the $R^3$ values being H.

In embodiments of the present disclosure, the molar ratio of the first component to second component of the functionalized polyacrylate polymer composition is in the range of from about 1:2 to about 2:1. In embodiments of the present disclosure, molar ratio of the first component to second component of the functionalized polyacrylate polymer composition is in the range of from about 5:9 to about 5:4.

In embodiments of the present disclosure, the acid value of the functionalized polyacrylate polymer composition is in the range of from about 25 to about 50 mg KOH/g. In some embodiments of the present disclosure, the functionalized polyacrylate polymer composition has an acid value in the range of from about 30 to about 45 mg KOH/g. It is considered that the acid value controls the absorption of the functionalized polyacrylate polymer composition to the clay.

It is also considered that the molecular weight of the functionalized polyacrylate polymer composition has an effect on the clay mitigation and the workability of the clay. In embodiments of the present disclosure, the average molecular weight of the functionalized polyacrylate polymer composition is in the range of from about 20,000 g/mol to about 100,000 g/mol.

The molecular weight as described in this disclosure can be measured using Aqueous Gel Permeation Chromatography (GPC) such as ULTRAHYDROGEL 120, ULTRAHYDROGEL 250 and ULTRAHYDROGEL 1000 (available from Waters Corporation). Polyethylene glycol (PEG) can be used as standard for calibration. The GPC processing conditions were as follows: 0.1M aqueous potassium nitrate as elution solvent, flow rate of 0.8 mL/min, injection volume of 10 µL, column temperature at 30° C., and refractive index detection for a waters 1500 series system.

The acid value corresponds to the amount of carboxylic acid group in the polymer and can be measured using an automatic Metro Ohm titrator. A sample containing ±1 mmol of un-neutralized polymer is weighed in a 250 ml beaker. A 125 ml water/2-isopropanol mixture is prepared and is heated in a conical flask until it boils. A few drops of phenolphthalein solution is added. Drops of 0.1M NaOH are added until the solutions becomes light pinkish. Then the water/2-isopropanol mixture is added to the 250 ml beaker. This solution is titrated with a 0.1M NaOH solution. The automatic titrator measures the pH during the titration and uses this to calculate the equivalence point, which determine the acid value. The acid value which is expressed in mg KOH/g, is corrected by the solid content of the polymer and other acids used in preparation of polymer. Such acids may come from, e.g., the initiator and chain transfer agent used for polymerization. Examples of a chain transfer agents are mercaptoethanol, thioglycerol, mercaptopropionic acid, 2-mercaptopropionic acid, 3-mercaptopropionic acid, phosphorous acid, sulfuric acid, hydrosulfurous acid and combinations thereof. Suitable polymerization initiators are ammonium persulfate, sodium persulfate, potassium persulfate, hydrogen peroxide, azo compounds such as azoisobutylronitrile and azobis-2-methylpropionamidine hydrochloride, and combinations thereof.

In an embodiment of the present disclosure, the functionalized polyacrylate polymer composition further comprises a third component. In these embodiments the first component, second component and third component are polymerized together. The third component may be selected from acrylamides, N-alkyl acrylamides, N,N-dialkyl acrylamides, 3-acrylamido-2-methylpropane sulfonic acids, salts of 3-acrylamido-2-methylpropane sulfonic acid, and styrene sulfonic acids, salts of styrene sulfonic acid or combinations thereof. Salts of 3-acrylamido-2-methylpropane sulfonic acid may include 3-acrylamido-2-methylpropane sulfonic acid sodium salt and 3-acrylamido-2-methylpropane sulfonic acid potassium salt and combinations thereof. Salts of styrene sulfonic acid may include 4-Styrenesulfonic acid sodium salt hydrate, Poly(4-styrenesulfonic acid) lithium salt, and combinations thereof.

In an embodiment of the present disclosure, an admixture composition for modifying a cementitious composition is disclosed that includes a functionalized polyacrylate polymer composition as described above and at least one admixture additive.

Admixture additives generally describes any chemical or material that is added to a cementitious composition or aggregate composition in order to alter the properties or performance of the cementitious composition or aggregate composition. Admixture additives may be selected from binders, water, dispersants, water reducing agents, plasticizers, superplasticizers, set retarders, set accelerators, defoamers, air entraining agents, shrinkage-reducing agents, crack control agents, strength enhancing agents, fibers and combinations thereof.

A variety of cementitious binders can be utilized and includes Portland cement, cement in accordance with European and American standard as well as API cement standard for oil well cementing, masonry cement, and may also include limestone powder, calcined gypsum product, pozzolans, PFA (pulverized fuel ash) or fly ash, GGBS (ground granulated blastfurnace slag), silica fume or microsilica, metakaolin and ultrafine amorphous colloidal silica(nanosilica).

Exemplary dispersants contemplated for use in methods and compositions of the present disclosure include EO-PO polymers and EO-PO comb polymers, as described for example in U.S. Pat. Nos. 6,352,952 B1 and 6,670,415 B2 of Jardine et al., which mentioned the polymers taught in U.S. Pat. No. 5,393,343 (assigned to W. R. Grace & Co.-Conn.). Another exemplary cement dispersant polymer, also containing EO/PO groups, is obtained by polymerization of maleic anhydride and an ethylenically-polymerizable polyalkylene, as taught in U.S. Pat. No. 4,471,100. In addition, EO/PO-group-containing cement dispersant polymers are taught in U.S. Pat. Nos. 5,661,206 and 6,569,234. The amount of such polycarboxylate cement dispersants used within concrete may be in accordance with conventional use (e.g., 0.05% to 0.25% based on weight of active polymer to weight of cementitious material).

Water reducing agents may be any PCE dispersants having ethylene oxide and/or propylene oxide groups. The water reducing agent may also be lignin sulfonates, naphthalene sulfonate formaldehyde condensates, gluconic acids and/or gluconates, and the like.

Defoamers or air detrainers are used to decrease the air content in the cementitious composition. Examples of defoamers that can be utilized in the present disclosure include, but are not limited to tributyl phosphate, dibutyl phtalare, octyl alcohol, water insoluble esters of carbonic and boric acid, acetylenic diols, ethylene oxide-propylene oxide block or random copolymers, and silicones.

The dosage of admixtures additives in the particular cementitious composition or aggregate composition will depend on application, nature and quality of the cement, water/cement ratio, temperature, application objectives, other admixtures employed, and other factors typically considered by the construction worker/artisan.

One skilled in the art, with the benefit of this disclosure, will recognize other suitable admixture additives for use with embodiments of the present disclosure.

In an embodiment of the present disclosure, a method for preparing a functionalized polyacrylate polymer composition is disclosed comprising polymerizing: a first component represented by the following structure:

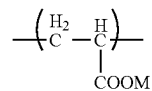

wherein M is H, an alkali metal or an organic radical; with a second component represented by the following structure:

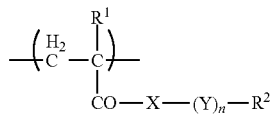

wherein $R^1$ is H or $CH_3$, $R^2$ is independently H or a $C_1$-$C_4$ alkyl, X is O or NH, and Y is represented by the following structure:

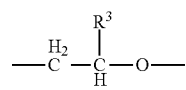

wherein $R^3$ is independently H or $CH_3$ in each Y structure of $(Y)_n$, n is 35 to 200 and wherein $R^3$ is H in at least 70% of the individual Y structures of $(Y)_n$.

In embodiments of the present disclosure, the functionalized polyacrylate polymer composition has an acid value of in the range of from about 25 to about 50 mg KOH/g and an average molecular weight of the functionalized polyacrylate polymer composition is in the range of from about 20,000 g/mol to about 100,000 g/mol.

As used herein, "polymerizing" may also include preparing the functionalized polyacrylate polymer composition by grafting polyoxyalkylene groups of the second component onto a polyacrylic acid polymer. In this case, $R^1$ in the functionalized polyacrylate polymer composition is hydrogen. The chemical linkage of the polyoxyalkylene and the carboxylic polymer can be an ester, amide, imide or mixtures thereof.

In embodiments of the present disclosure, a method for preparing a functionalized polyacrylate polymer composition further comprises polymerizing the first component and the second component with a third component. The third component is selected from acrylamides, N-alkyl acrylamides, N,N-dialkyl acrylamides, 3-acrylamido-2-methylpropane sulfonic acid, salts of 3-acrylamido-2-methylpropane sulfonic acid, styrene sulfonic acids, salts of styrene sulfonic acid and combinations thereof.

In an embodiment of the present disclosure, a method for preparing a functionalized polyacrylate polymer composition further comprises neutralizing the functionalized polyacrylate polymer composition. The functionalized polyacrylate polymer composition may be either partially or fully neutralized with one or more neutralizing agents. Example of neutralizing agents include, without limitation, alkali metal hydroxides such as sodium hydroxide and organic amines such as triethanolamine or methyl diethanolamine. One skilled in the art, with the benefit of this disclosure will recognize other suitable neutralizing agents that may be used herein.

The functionalized polyacrylate polymer compositions according to the present disclosure may be incorporated into various cementitious compositions and/or aggregate compositions. In an embodiment of the present disclosure, a method for the mitigation of clays in a cementitious composition or an aggregate composition is disclosed that involves adding a functionalized polyacrylate polymer composition to a cementitious composition or an aggregate composition.

In an embodiment of the present disclosure, the functionalized polyacrylate polymer composition is added to the aggregate of the cementitious mixture before the water reducing agent is added. This way the functionalized polyacrylate polymer composition will prevent the clay from compromising the effectiveness of the water reducing agent. This may allow for more precise dosing of the water reducing agent as well as increasing the dosage efficiency of the water reducing agents.

In an embodiment of the present disclosure, the functionalized polyacrylate polymer composition is added to the cementitious composition or aggregate composition in an amount of about 0.001 wt % to about 30.000 wt % based on dry weight of clay contained in the cementitious composition or aggregate composition. The dry weight of clay in aggregates can be measured according to general known methods in the art, such as the sand equivalent (SE) test (ASTM D 2419), linear shrinkage test (Tex-107-E), plasticity index (PI) test (Tex-106-E) and methylene blue value (MBV) used to give an indication of the "cleanliness" of aggregates.

In embodiments of the present disclosure, the cementitious compositions or aggregate compositions may further include one or more admixture additives as described herein.

The following examples are given as a specific illustration of embodiments of the present disclosure. It should be understood that these examples are not limiting of the embodiments of the present disclosure.

EXAMPLES

The preparation of the functionalized polyacrylate polymer compositions (Polymers P1-P4) according to the present disclosure and comparative polymers (Comparative Polymers C1-C6) are discussed below and summarized in Table 1.

Polymer P1

A 500 milliliter (ml) four-necked flask equipped with a thermocouple probe, a sparge tube and a mechanical stirrer was assembled and filled with 46.6 grams (g) of un-neutralized polyacrylic acid available from BASF (SOKALAN® CP10s, average molecular weight of 4,000 g/mol, solid content of 50%, acid value of 325 mg KOH/g) and 217.69 g of SURFONAMINE® L200 polyetheramine available from Huntsman Corporation (polyethermonoamine, average molecular weight of 2,000 g/mol, Ethylene oxide/Propylene oxide=95/5 wt %). The flask was nitrogen-purged for 5 minutes and the temperature was kept below 60 degrees Celcius (° C.). The flask was fitted with a Dean-Stark trap for overhead collection during the reaction. The temperature was controlled with a thermocouple input. The reaction mixture was heated to 160° C. and water was removed from the flask. When the reaction mixture reached 160° C. the start of reaction time was recorded. Samples were taken after 4.5 and 5 hours (h) to measure the acid value. Once the acid value remained constant, the reaction was stopped. The final acid value of the polymer was 33.3 mg KOH/g and then the polymer was neutralized with either sodium hydroxide or monoethanolamine and labeled as Polymer P1-1 and P1-2 respectively.

Polymer P2

A 500 ml four-necked flask equipped with a thermocouple probe, a sparge tube and a mechanical stirrer was assembled and filled with 45.9 g of un-neutralized polyacrylic acid available from Lubrizol (CARBOSPERSE® K-XP44, average molecular weight of 6,000 g/mol, solid content of 50%, acid value of 335 mg KOH/g) and 223.7 g of SURFO- NAMINE® L200 polyetheramine available from Huntsman Corporation (polyethermonoamine, average molecular weight of 2,000 g/mol, Ethylene oxide/Propylene oxide=95/5 wt %). The flask was nitrogen-purged for 5 minutes and the temperature was kept below 60° C. The flask was fitted with a Dean-Stark trap for overhead collection during the reaction. The temperature was controlled with a thermocouple input. The reaction mixture was heated to 160° C. and water was removed from the flask. When the reaction mixture reached 160° C. the start of reaction time was recorded. Samples were taken after 5 and 5.5 h to measure the acid value. Once the acid value remained constant, the reaction was stopped. The final acid value of polymer was 32.0 mg KOH/g and then, the polymer was further neutralized with either sodium hydroxide, methyl diethanolamine or triethanolamine, and labeled as Polymer P2-1, P2-2 and P2-3 respectively.

Polymer P3

A 500 ml four-necked flask equipped with a thermocouple probe, a sparge tube and a mechanical stirrer was assembled and filled with 48.8 g of un-neutralized polyacrylic acid available from Lubrizol (CARBOSPERSE® K-XP44, average molecular weight of 6,000 g/mol, solid content of 50%, acid value of 335 mg KOH/g) and 227.5 g of methoxy polyethylene glycol available from Clariant (MPEG 2000s, average molecular weight of 2,000 g/mol, Ethylene oxide/Propylene oxide=100/0 wt %). The flask was nitrogen-purged for 5 minutes and the temperature was kept below 60° C. The flask was fitted with a Dean-Stark trap for overhead collection during the reaction. The temperature was controlled with thermocouple input. The reaction mixture was heated to 160° C. and water was removed from the flask. When the reaction mixture reached 160° C. the start of reaction time was recorded. After 8 hours, the reaction was stopped and cooled down. The final acid value of the polymer was 34.9 mg KOH/g and then the polymer was neutralized with sodium hydroxide.

Polymer P4

A 2,000 ml four-necked flask equipped with a thermocouple probe, a sparge tube and a mechanical stirrer was assembled and filled with 172.23 g of un-neutralized polyacrylic acid available from Lubrizol (CARBOSPERSE® K-XP44, average molecular weight of 6,000 g/mol, solid content of 50%, acid value of 335 mg KOH/g) and 800.13 g of methoxy polyethylene glycol available from Clariant (MPEG 2000s, average molecular weight of 2,000 g/mol, Ethylene oxide/Propylene oxide=100/0 wt %). The flask was nitrogen-purged for 5 minutes and the temperature was kept below 60° C. The flask was fitted with a Dean-Stark trap for overhead collection during the reaction. The temperature was controlled with a thermocouple input. The reaction mixture was heated to 160° C. and water was removed from the flask. When the reaction mixture reached 160° C. the start of the reaction time was recorded. After 3 hours, the reaction was stopped and cooled down. The final acid value of the polymer was 41.7 mg KOH/g and then the polymer was neutralized with sodium hydroxide.

Preparation of Comparative Polymers.

Comparative Polymer C1

A 500 ml four-necked flask equipped with a thermocouple probe, a sparge tube and a mechanical stirrer was assembled and filled with 41.52 g of un-neutralized polyacrylic acid (CARBOSPERSE® K-XP97, average molecular weight=2,000 g/mol, 65% solid content, acid value=387 mg KOH/g) and 231.97 g of SURFONAMINE® L200 polyetheramine available from Huntsman Corporation (Polyethermonoamine, average molecular weight of 2,000 g/mol, Ethylene oxide/Propylene oxide=95/5 wt %). The flask was nitrogen-purged for 5 minutes and the temperature was kept below 60° C. The flask was fitted with a Dean-Stark trap for overhead collection during the reaction. The temperature was controlled with a thermocouple input. The reaction mixture was heated to 160° C. and water was removed from the flask. When the reaction mixture reached 160° C. the start of reaction time was recorded. The flask contents were sampled after 4.5 and 5 h for acid value measurement. When the acid value remained constant, the reaction was stopped. The final acid value of the polymer was 33.6 mg KOH/g and the polymer was neutralized with sodium hydroxide.

Comparative Polymer C2

A 500 ml four-necked flask equipped with a thermocouple probe, a sparge tube and a mechanical stirrer was assembled and filled with 24.08 g of un-neutralized polyacrylic acid available from BASF (SOKALAN® CP10s, average molecular weight of 4,000 g/mol, solid content of 50%, acid value=325 mg KOH/g) and 220.73 g of SURFONAMINE® L200 available from Huntsman Corporation (polyethermonoamine, average molecular weight of 2,000 g/mol, Ethylene oxide/Propylene oxide=95/5 wt %). The flask was nitrogen-purged for 5 minutes and the temperature was kept below 60° C. The flask was fitted with a Dean-Stark trap for overhead collection during the reaction. The temperature was controlled with thermocouple input. The reaction mixture was heated to 160° C. and water was removed from the flask. When the reaction mixture reached 160° C. the start of reaction time was recorded. The flask contents were sampled after 6.5 and 7.5 h for measuring the acid value. Once the acid value remained constant, the reaction was stopped. The final acid value of the polymer was 8.9 mg KOH/g and the polymer was neutralized with sodium hydroxide.

Comparative Polymer C3

A 1,000 ml four-necked flask equipped with a thermocouple probe, a sparge tube and a mechanical stirrer was assembled and filled with 97 g of un-neutralized polyacrylic acid available from BASF (SOKALAN® CP10s, average molecular weight of 4,000 g/mol, solid content of 50%, and acid value of 325 mg KOH/g) and 444.71 g of JEFFAMINE® M1000 polyetheramine available from Huntsman Corporation (polyethermonoamine, average molecular weight of 1,000 g/mol, Ethylene oxide/Propylene oxide=95/5 wt %). The flask was nitrogen-purged for 5 minutes and the temperature was kept below 60° C. The flask was fitted with a Dean-Stark trap for collecting the overhead during the reaction. The temperature was controlled with a thermocouple input. The reaction mixture was heated to 160° C. and water was removed from the flask. When the reaction mixture reached 160° C. the start of reaction time was recorded. The flask contents were sampled after 6.5 h to measure the acid value. Once the acid value remained constant, the reaction was stopped. The final acid value of the polymer was 9.8 mg KOH/g and the polymer was neutralized with sodium hydroxide.

Comparative Polymer C4

A 2,000 ml four-necked flask equipped with a thermocouple probe, a sparge tube and a mechanical stirrer was assembled and filled with 172.23 g of un-neutralized polyacrylic acid available from Lubrizol (CARBOSPERSE® K-XP44, average molecular weight of 6,000 g/mol, solid content of 50%, acid value of 335 mg KOH/g) and 800.13 g of methoxy polyethylene glycol available from Clariant (MPEG 2000s, average molecular weight of 2,000 g/mol, Ethylene oxide/Propylene oxide=100/0 wt %). The flask was nitrogen-purged for 5 minutes and the temperature was kept below 60° C. The flask was fitted with a Dean-Stark trap for overhead collection during the reaction. The temperature was controlled with a thermocouple input. The reaction mixture was heated to 160° C. and water was removed from the flask. When the reaction mixture reached 160° C. the start of the reaction time was recorded. After 1 hour, the reaction was stopped and cooled down. The final acid value of the polymer was 52.2 mg KOH/g and then the polymer was neutralized with sodium hydroxide.

Comparative Polymer C5

A 1-liter jacketed flask with 5-neck lid was fitted with an overhead stirrer, a thermometer probe, condenser, and a nitrogen inlet tube. Two separate solutions were prepared, namely Solution A (monomer mix) consisting of 500 g of methoxy polyethylene glycol (average molecular weight of 2,000 g/mol, 50% in water), available from Sigma Aldrich, 12.4 g of methacrylic acid and 1.27 g of mercapto propionic acid (MPA); and Solution B (Initiator solution) containing 9.51 g of water and 1.057 g of $Na_2S_2O_8$.

After addition of 125 g water to a reaction flask and heating the water to 75° C., the monomer mix and initiator solution were added simultaneously over a period of 3 hours while the temperature was kept at 75° C. The monomer mix, initiator solution and reactor were kept under nitrogen during the addition. When the addition was complete, the mixture was further stirred under nitrogen at 75° C. for 3 hours. Thereafter, the mixture was cooled and the acid value was measured. The final acid value of the polymer (corrected) was 31 mg KOH/g and then the polymer was neutralized with sodium hydroxide.

Comparative Polymer C6

A 1-liter jacketed flask with 5-neck lid was fitted with an overhead stirrer, a thermometer probe, a condenser, and a nitrogen inlet tube. Two separate solutions were prepared, namely Solution A (monomer mix) consisting of 500 g of methoxy polyethylene glycol (average molecular weight of 2,000 g/mol, 50% in water), available from Sigma Aldrich, 5.51 g of methacrylic acid, 8.34 g of acrylic acid and 2.08 g of mercapto propionic acid (MPA); and Solution B (Initiator solution) containing 123.4 of water, 3.1 g of ammonium persulfate and 10.34 g of hydrogen peroxide (35% solution).

After the addition of 150 g water added to the reaction flask the water was heated to 86° C. The monomer mix and initiator solution were added simultaneously. The monomer mix was added over a period of 3 hours, while the initiator solution was added over a period of 3.5 hours. The temperature was kept at 86° C. and the monomer mix, initiator solution and reactor were kept under nitrogen during the addition. When the addition was complete, the mixture was stirred under nitrogen at 86° C. for 2 hours. Thereafter, the mixture was cooled and the acid value was measured. The final acid value of polymer (corrected) was 40.1 mg KOH/g and then the polymer was neutralized with sodium hydroxide.

TABLE 1

Functionalized polyacrylate compositions and comparative polymers

| Polymer | Component A | Component B X | n | Y (EO/PO), wt % | Acid value, mg KOH/g | Mw (g/mol) |
|---|---|---|---|---|---|---|
| P1 | Acrylic acid | —NH— | 45 | 95/5 | 33.3 | 24508 |
| P2 | Acrylic acid | —NH— | 45 | 95/5 | 32.0 | 44266 |
| P3 | Acrylic acid | —O— | 45 | 100 | 34.9 | 28824 |
| P4 | Acrylic acid | —O— | 45 | 100 | 41.7 | 22652 |
| C1 | Acrylic acid | —NH— | 45 | 95/5 | 33.6 | 18703 |
| C2 | Acrylic acid | —NH— | 45 | 95/5 | 8.9 | 27084 |
| C3 | Acrylic acid | —NH— | 23 | 95/5 | 9.8 | 17329 |
| C4 | Acrylic acid | —O— | 45 | 100 | 52.2 | 18160 |
| C5 | Methacrylic acid | —O— | 45 | 100 | 31.0 | 46631 |
| C6 | Acrylic acid/ Methacrylic acid | —O— | 45 | 100 | 40.1 | 46353 |

Notes:

Mw = average molecular weight of polymer

Test Example 1

As used in these tests, the functionalized polyacrylate polymer compositions and comparative polymers are referred to as Clay Mitigation Agents (CMA). Table 2 compares the workability of two control samples, three functionalized polyacrylate polymer compositions (P1-1, P1-2, P2-1) and one comparative polymer C1. In particular, Table 2 shows that CMAs with molecular weights greater than 20,000 g/mol have higher workability than the CMA with a molecular weight less than 20,000 g/mol.

A mortar flow test was performed using cement type II, 32.5N (CEM II 32.5N B-M) (from Holcim). EN 196-1 sand (from SNL) was doped with 0.15 weight percent of sodium montmorrillonite clay (from Alfa Aesar) by weight of sand. The mix design comprised cement/sand/water in ratio of 540/1350/220 measured in grams weight. Both mortar slump and flow were measured and workability was calculated using the formula: [workability]=[slump]+[flow]−100.

The mixing procedure was as follows: (1) mix the sand, clay and cement for 2 minutes; (2) add the CMA with ⅔ of the mixing water, after 30 seconds of mixing add the PCE and defoamer with the rest of the mixing water and continue mixing for 3.5 minutes, so 4 minutes in total; (3) stop mixer and scrape sides and bottom of the bowl and let the mixture rest for 3 minutes; (4) Mix for 2 minutes at higher speed; and (5) conduct the slump-flow test and determine the air content.

PCE cement dispersant available from Nippon Shokubai (PX-1A-LX-1) is used in the mortar test and was dosed at 0.15% by weight of cement. Approximately 2 drops of SURFONIC® LF68 defoamer, available from Huntsman Corporation, is added to ensure the air content is less than 5%. CMA is added at dosage of 5.3% by weight of clay.

"No clay, No CMA" means that there is no clay added in the sand and no CMA is used. "No CMA" means that the clay is added in the sand, but no CMA is used.

TABLE 2

| Clay Mitigating Additives (CMA) | Neutralizing agent | Acid value, mg KOH/g | Mw (g/mol) | Workability in mm | % improvement | Air content, % |
|---|---|---|---|---|---|---|
| No Clay, No CMA | | | | 315 | | 0.50 |
| No CMA | | | | 140 | | 1.66 |
| Present Invention | | | | | | |
| P1-1 | Sodium Hydroxide | 33.3 | 24508 | 270 | 85.7 | 1.49 |
| P1-2 | Monoethanolamine | 33.3 | 24508 | 275 | 87.3 | 1.00 |
| P2-1 | Sodium Hydroxide | 32.0 | 44266 | 315 | 100.0 | 1.10 |
| Comparative polymer | | | | | | |
| C1 | Sodium Hydroxide | 33.6 | 18703 | 240 | 76.2 | 1.30 |

As seen in Table 2, the addition of CMA can restore mortar workability effectively (i.e. higher workability than the "No CMA" control sample). In Table 2 the CMAs all have comparable acid values. Therefore, this table compares the performance of the CMAs based upon their molecular weights. The functionalized polyacrylate polymer composition (P1-1) with a molecular weight greater than 20,000 g/mol showed higher workability than the CMA with a molecular weight of less than 20,000 g/mol (C1). There is only a minor difference in workability between the functionalized polyacrylate polymer composition neutralized with sodium hydroxide compared with the one neutralized using monoethanolamine. The functionalized polyacrylate polymer composition P2-1, with a molecular weight of 44,260, had the same workability as the "No Clay, No CMA" control sample.

Test Example 2

Table 3 compares the workability of a control sample, one functionalized polyacrylate polymer composition (P2-1), a commercial CMA (FLOQUAT® FL2250 commercially available from SNF Floerger) and two comparative polymers C2 and C3. In particular, Table 3 shows that the functionalized polyacrylate polymer composition (P2-1) compares favorably with the commercial CMA. Table 3 also shows that the CMA with an acid value higher than 20 mg KOH/g has better performance than the CMAs with acid values lower than 20 mg KOH/g. Lastly, Table 3, like the previous Table 2, shows additional evidence that a CMA with a molecular weight of less than 20,000 g/mol has poor performance.

A mortar flow test was performed using cement type II, 32.5N (CEM II 32.5N B-M) from Holcim. EN 196-1 sand was doped with 0.15 weight percent of sodium montmorrillonite clay (from Alfa Aesar) by weight of sand. The mix design comprised cement/sand/water in ratio of 540/1350/220 measured in grams per weight. Both mortar slump and flow were measured and the workability was calculated using the formula: [workability]=[slump]+[flow]−100. The mixing procedure is as described in test example 1.

PCE cement dispersant available from Nippon Shokubai (PX-1A-LX-1) is used in the mortar test and was dosed at 0.13% by weight of cement. Approximately 2 drops of SURFONIC® LF68 defoamer available from Huntsman Corporation is added to ensure the air content is less than 5%. CMA is added at dosage of 5.3% by weight of clay.

TABLE 3

| Clay Mitigating Additives (CMA) | Acid value, mg KOH/g | Mw (g/mol) | Workability in mm | % improvement | Air content, % |
|---|---|---|---|---|---|
| No clay No CMA | | | 260 | — | 1.67 |
| Present Invention | | | | | |
| P2-1 | 32.0 | 44266 | 240 | 92.31 | 1.42 |
| Comparative polymer | | | | | |
| FLOQUAT® FL2250 | — | — | 215 | 82.69 | 1.69 |
| C2 | 8.9 | 27084 | 60 | 23.08 | 1.89 |
| C3 | 9.8 | 17329 | 30 | 11.54 | 2.79 |

As seen in Table 3, The functionalized polyacrylate composition (P2-1) can significantly restore the workability of mortar at a 5.3% of loading by weight of clay. However, at the same dosage, FLOQUAT® FL2250 gave only 83% improvement. In addition, FLOQUAT® FL2250 contains chlorine, which can cause corrosion of steel reinforcement.

The data in Table 3 also supports that the performance of the CMAs depend on the acid value of the polymer and the molecular weight. Comparative polymer C2, having an acid value of 8.9, had poor workability. Comparative polymer C3, having an acid value of lower than 20 mg KOH/g and a molecular weight of less than 20,000 g/mol, showed the lowest performance.

Test Example 3

Table 4 compares the workability of a control sample, two functionalized polyacrylate polymer compositions (P3 and P4), a commercial CMA (FLOQUAT® FL2250) and three comparative polymers (C4, C5 and C6). In particular, Table 4 shows that CMAs having acid values higher than 50 mg KOH/g result in poorer workability performance than the CMAs with acid values lower than 50 mg KOH/g. Also, Table 4 shows that CMAs that have a first component that are not made out of primarily acrylic acid monomers, such as those made with methacrylic acid (C5) or methacrylic and acrylic acid (C6), have poorer workability performance.

A mortar flow test was performed using cement type II, 32.5N (CEM II 32.5N B-M) from Holcim. EN 196-1 sand (from SNL) was doped with 1.0 weight percent of sodium montmorrillonite clay (from Alfa Aesar) by weight of sand. The mix design comprised cement/sand/water in ratio of 540/1350/220 measured in grams weight. Both mortar slump and flow were measured and workability was calculated using the formula: [workability]=[slump]+[flow]−100. The mixing procedure is as described in test example 1.

PCE cement dispersant available from Nippon Shokubai (PX-1A-LX-1) is used in the mortar test and was dosed at 0.11% by weight of cement. Approximately 2 drops of SURFONIC® LF68 defoamer, available from Huntsman Corporation, are added to ensure that the air content is less than 5%. CMA is added at dosage of 7.5% by weight of clay.

TABLE 4

| Clay Mitigating Additives (CMA) | Acid value, mg KOH/g | Mw (g/mol) | Workability, mm | % improvement | Air content, % |
|---|---|---|---|---|---|
| No Clay No CMA | | | 210 | — | 2.59 |
| Present Invention | | | | | |
| P3 | 34.9 | 28824 | 340 | 162 | 1.03 |
| P4 | 41.7 | 22652 | 300 | 143 | 1.52 |
| Comparative examples | | | | | |
| FLOQUAT® FL2250 | — | — | 180 | 86 | 2.48 |
| C4 | 52.2 | 18160 | 140 | 67 | 2.35 |
| C5 | 31.0 | 46631 | 140 | 67 | 2.60 |
| C6 | 40.1 | 46353 | 180 | 86 | 2.86 |

As can be seen in Table 4, the performance of CMAs depends on the acid value of the CMA. The performance of the CMA having an acid value greater than 50 mg KOH/g, denoted as C4, shows lower performance than the CMAs according to the present disclosure (Polymers P3 and P4), that each have an acid value between 30 and 45 mg KOH/g.

In addition to the influence of the acid value, the structure of polymer plays an important role in mitigating of the clay. C5 has methacrylic acid as a first component in its polymer. C6 has a mixture of methacrylic acid and acrylic acid as the first component in its polymer. C5 and C6 are examples as described in Pub. No. US2015/0133584. Rather, P3 and P4 only have acrylic acid monomers as the first component in its composition. As can be seen in Table 4, the functionalized polyacrylate compositions P3 and P4 have better performance than C5 and C6. It could be that the methyl group in component A hinders the clay adsorption to the polymer, hence some clays become available in the mixture, and therefore the clay is still able to reduce the workability of the mortar.

Test Example 4

Table 5 compares the workability and compressive strength of a control sample and three functionalized polyacrylate polymer compositions (P2-1, P2-2, P2-3) that were each neutralized with different neutralizing agents.

A mortar flow test was performed using cement type II, 32.5N (CEM II 32.5N B-M) from Holcim. EN 196-1 sand (from SNL) was doped with 1.0 weight percent of sodium montmorrillonite clay (from Alfa Aesar) by weight of sand. The mix design comprised cement/sand/water in ratio of 540/1350/220 measured in grams weight. Both mortar slump and flow were measured and workability was calculated using the formula: [workability]=[slump]+[flow]−100. The mixing procedure follows as described in test example 1.

Polycarboxylate cement dispersant (PCE) available from Nippon Shokubai (PX-1A-LX-1) is used in the mortar test and was dosed at 0.11% by weight of cement. Approximately 2 drops of SURFONIC® LF68 defoamer available from HUNTSMAN Corporation, used as defoamer is added to ensure that the air content is less than 5%. Clay Mitigating Additive (CMA) is added at dosage of 10.2% by weight of clay.

TABLE 5

| Clay Mitigating Additives (CMA) | Neutralizing agent | pH of CMA | Workability, mm | Compressive strength (Mpa) at | | |
|---|---|---|---|---|---|---|
| | | | | 1 day | 7 days | 28 days |
| No Clay No CMA | — | | — | 210 | 11.0 | 40.2 | 55.5 |
| P2-1 | Sodium hydroxide | 6.39 | 250 | 11.1 | 39.8 | 54.7 |
| P2-2 | Methyl Diethanolamine | 7.21 | 250 | 13.0 | 40.8 | 59.3 |
| P2-3 | Triethanolamine | 6.58 | 270 | 10.8 | 39.7 | 57.2 |

As can be seen in Table 5, the use of triethanolamine as a neutralizing agent in the functionalized polyacrylate composition P2 leads to the most improved workability of the samples tested. In addition, the use of methyl diethanolamine as a neutralizing agent leads to the most improved compressive strength of the samples tested.

The invention claimed is:

1. A functionalized polyacrylate polymer composition for treating clay or clay bearing aggregate compositions, wherein the functionalized polyacrylate polymer composition comprises a polymer obtained from polymerizing:
   A) a first component comprising a group represented by the following structure:

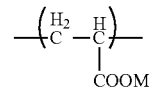

wherein M is an organic radical selected from tris-(2-hydroxyethyl) methylammonium hydroxide and choline hydroxide; and
   B) a second component comprising a group represented by the following structure:

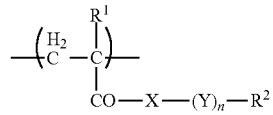

wherein $R^1$ is H or $CH_3$;
$R^2$ is H or a $C_1$-$C_4$ alkyl;
X is O or NH; and
Y is represented by the following structure:

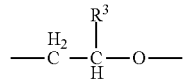

wherein $R^3$ is independently H or $CH_3$ in each Y structure of $(Y)_n$; and
n is 35 to 200; and
wherein $R^3$ is H in at least 70% of the individual Y structures of $(Y)_n$; and
wherein the acid value of the functionalized polyacrylate polymer composition is in the range of from 32 to 50 mg KOH/g as determined by titration; and
wherein the weight average molecular weight of the functionalized polyacrylate polymer composition is in the range of from 20,000 g/mol to 100,000 g/mol.

2. The functionalized polyacrylate polymer composition according to claim 1, wherein the polymer is obtained from polymerizing the first component and the second component and a third component selected from the group consisting of: an acrylamide, N-alkyl acrylamide, N,N-dialkyl acrylamide, 3-acrylamido-2-methylpropane sulfonic acid, a salt of 3-acrylamido-2-methylpropane sulfonic acid, styrene sulfonic acid, a salt of styrene sulfonic acid and combinations thereof.

3. The functionalized polyacrylate polymer composition according to claim 1, wherein the acid value of the functionalized polyacrylate polymer composition is in the range of from 32 to 45 mg KOH/g.

4. The functionalized polyacrylate polymer composition according to claim 1, wherein the molar ratio of the first component to the second component is in the range of from 1:2 to 2:1.

5. The functionalized polyacrylate polymer composition according to claim 1, wherein the molar ratio of the first component to the second component is in the range of from 5:9 to 5:4.

6. The functionalized polyacrylate polymer composition according to claim 1, wherein $R^3$ is H in at least 85% of the individual Y structures of $(Y)_n$.

7. The functionalized polyacrylate polymer composition according to claim 1, wherein the first component has an average molecular weight in the range of from 4,000 g/mol to 20,000 g/mol.

8. The functionalized polyacrylate polymer composition according to claim 1, wherein the second component has an average molecular weight in the range of from 1,800 g/mol to 6,000 g/mol.

9. An admixture composition for modifying a cementitious composition, the admixture composition comprising:
(i) a functionalized polyacrylate polymer composition comprising:
A) a first component represented by the following structure:

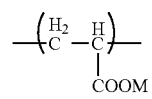

wherein M is an organic radical selected from tris-(2-hydroxyethyl) methylammonium hydroxide and choline hydroxide;
B) a second component represented by the following structure:

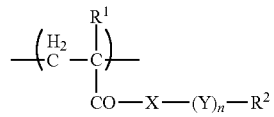

wherein $R^1$ is H or $CH_3$;
$R^2$ is H or a $C_1$-$C_4$ alkyl;
X is O or NH; and
Y is represented by the following structure:

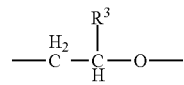

wherein $R^3$ is independently H or $CH_3$ in each Y structure of $(Y)_n$; and
n is 35 to 200; and
wherein $R^3$ is H in at least 70% of the individual Y structures of $(Y)_n$; and
wherein the acid value of the functionalized polyacrylate polymer composition is in a range of from 32 to 50 mg KOH/g; and
wherein the average molecular weight of the functionalized polyacrylate polymer composition is in the range of from 20,000 g/mol to 100,000 g/mol; and
(ii) at least one admixture additive selected from the group consisting of: a binder, water, a dispersant, a water reducing agent, a plasticizer, a superplasticizer, a set retarder, a set accelerator, a defoamer, an air entraining agent, a shrinkage-reducing agent, a crack control agent, a strength enhancing agent, a fiber and combinations thereof.

10. A method for preparing a functionalized polyacrylate polymer composition comprising polymerizing:
A) a first component represented by the following structure:

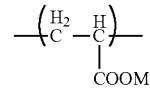

wherein M is an organic radical selected from tris-(2-hydroxyethyl) methylammonium hydroxide and choline hydroxide; with
B) a second component represented by the following structure:

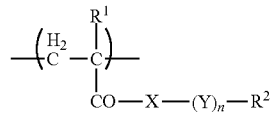

wherein $R^1$ is H or $CH_3$;
$R^e$ is independently H or a $C_1$-$C_4$ alkyl;
X is O or NH; and
Y is represented by the following structure:

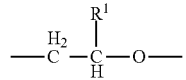

wherein $R^3$ is independently H or $CH_3$ in each Y structure of $(Y)_n$; and
n is 35 to 200; and
wherein $R^3$ is H in at least 70% of the individual Y structures of $(Y)_n$; and
wherein the acid value of the functionalized polyacrylate polymer composition is in the range of from 32 to 50 mg KOH/g; and
wherein the average molecular weight of the functionalized polyacrylate polymer composition is in the range of from 20,000 g/mol to 100,000 g/mol.

11. The method for preparing a functionalized polyacrylate polymer composition according to claim 10, further comprising polymerizing the first component and the second component with a third component, wherein the third component is selected from the group consisting of: an acrylamide, a N-alkyl acrylamide, a N,N-dialkyl acrylamide, 3-acrylamido-2-methylpropane sulfonic acid, a salt of 3-acrylamido-2-methylpropane sulfonic acid, styrene sulfonic acid, a salt of styrene sulfonic acid and combinations thereof.

12. The method for preparing a functionalized polyacrylate polymer composition according to claim 10, further comprising neutralizing the functionalized polyacrylate polymer composition.

13. A method for the mitigation of clays in a cementitious composition or an aggregate composition comprising adding a functionalized polyacrylate polymer composition according to claim 1 to the cementitious composition or the aggregate composition.

14. The method according to claim 13, wherein the functionalized polyacrylate polymer composition is added to the cementitious composition or aggregate composition in an amount of 0.001 wt % to 30.000 wt % based on dry weight of clay contained in the cementitious composition or aggregate composition.

* * * * *